United States Patent [19]

Arrington

[11] Patent Number: 4,504,114
[45] Date of Patent: Mar. 12, 1985

[54] METHOD OF TRANSMITTING UV LIGHT THROUGH OPTICAL FIBERS

[75] Inventor: John P. Arrington, San Carlos, Calif.

[73] Assignee: Raychem Corporation, Menlo Park, Calif.

[21] Appl. No.: 618,314

[22] Filed: Jun. 7, 1984

Related U.S. Application Data

[63] Continuation-in-part of Ser. No. 376,863, May 10, 1982, abandoned.

[51] Int. Cl.³ .................................................. G02B 5/172
[52] U.S. Cl. ............................ 350/96.34; 350/1.1; 350/96.29; 350/320
[58] Field of Search ............... 350/1.1, 96.29, 96.30, 350/96.31, 96.34, 320

[56] References Cited

U.S. PATENT DOCUMENTS

| | | | |
|---|---|---|---|
| 3,966,300 | 6/1976 | Bernsee | 350/96.30 X |
| 4,075,493 | 2/1978 | Wickersheim | 356/44 X |
| 4,210,386 | 7/1980 | Araujo et al. | 350/96.31 |
| 4,215,275 | 7/1980 | Wickersheim | 356/44 X |
| 4,232,938 | 11/1980 | Dabby et al. | 350/96.30 X |
| 4,403,826 | 9/1983 | Presby | 350/96.30 |

OTHER PUBLICATIONS

Li et al., "Fused Quartz Fiber Optics for Ultraviolet Transmission", *Ceramic Bulletin*, vol. 48, No. 2, Feb. 1969, pp. 214–216, 219, 220.

Buyken et al., "Properties of UV-Fibers", *Optical Engineering*, vol. 12, No. 4, Jul./Aug. 1973, pp. 142-148.

*Primary Examiner*—John D. Lee
*Attorney, Agent, or Firm*—Herbert G. Burkard; T. Gene Dillahunty; Dennis E. Kovach

[57] ABSTRACT

A method of transmitting light which has a substantial component having a wavelength below 300 nm includes passing said light through an optical fiber which has a core of synthetic fused silica containing between 500 and 1500 ppm water and a cladding of fluorine-doped synthetic fused silica. Apparatus employing such a fiber is also described.

39 Claims, 1 Drawing Figure

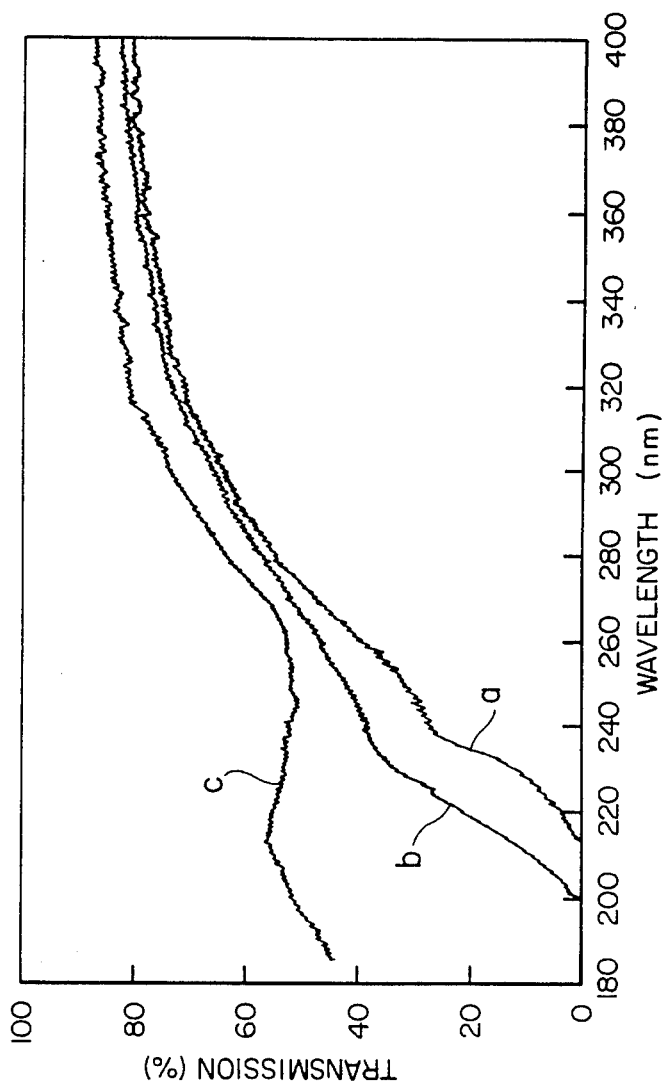
FIG_1

METHOD OF TRANSMITTING UV LIGHT THROUGH OPTICAL FIBERS

This application is a continuation-in-part of application Ser. No. 376,863, filed May 10, 1982 (abandoned).

BACKGROUND OF THE INVENTION

1. Field of the Invention

This invention relates to a method of transmitting light having a substantial UV component via an optical fiber, and especially to a method of transmitting light of wavelengths in the vacuum UV.

2. Introduction to the Invention

Although conventional fiber optics systems, such as are coming into increasing use in the telecommunications industry, employ light in the visible or, more usually, in the near-IR wavelength range, it is sometimes desirable to be able to transmit UV light via an optical fiber. By UV light is meant light having a wavelength between about 150 and 400 nanometers, with that portion having a wavelength less than about 200 nanometers being referred to as the vacuum ultraviolet.

Most fibers, having a doped fused silica core and a fused silica cladding, are not however satisfactory for UV transmission since the dopants cause the fiber to absorb some components of UV light. As fused silica has the lowest UV absorption of glassy materials, it is potentially an extremely suitable material for a UV transmitting fiber, but its low index of refraction makes the finding of a suitable cladding difficult.

Certain polymers, notably siloxanes (polydimethyl siloxanes) and fluorocarbons such as FEP (fluorinated ethylene-propylene) do have a lower refractive index than fused silica, and are thus usable as claddings for silica cored fibers. Such fibers are generically referred to as PCS fibers. It is known that these fibers will transmit UV light, but they suffer from several disadvantages: (1) because the core-cladding interface is not as good as that in an all-silica fiber, scattering is more severe and this decreases transmission (this effect is more pronounced at shorter wavelengths), (2) siloxanes absorb substantially below 210 nm, and (3) the presence of a polymer cladding renders the fiber less suitable for operation at high temperatures or in other harsh environments.

A fiber having a transmission in the vacuum UV is thus desirable but not obtainable with present commercial PCS fibers.

Fibers comprising a core of fused silica and a cladding of fluorine- or boron-doped fused silica have been developed for their radiation hardness, since they contain substantially only low atomic weight elements. Such fibers, and methods for their manufacture, are disclosed in, inter alia, U.S. Pat. Nos. 4,082,420; 4,161,505; 4,162,908; 4,165,152; 4,165,915; 4,221,825; 4,242,375; and 4,295,869. Preforms for such fibers are generally produced by the combustion of a silicon compound in oxygen to produce synthetic fused silica, and the dopant is introduced by the addition to the combustion mixture of a source of the dopant, eg. $BBr_3$ for boron or $CCl_2F_2$ for fluorine. Combustion of the dopant sources in the oxygen produces the dopant material, and by fluorine-doped synthetic fused silica is meant a synthetic fused silica into which has been introduced fluorine or a chemical compound thereof.

DESCRIPTION OF THE INVENTION

Summary of the Invention

In a first aspect, this invention comprises a method for the transmission of light having a substantial UV component, which method comprises transmitting such light through an optical fiber comprising a core consisting essentially of synthetic fused silica containing between 500 and 1500 ppm water and a cladding consisting essentially of fluorine-doped synthetic fused silica.

In a second aspect, this invention comprises apparatus comprising a fiber as described above and light-responsive means located adjacent one end of said fiber and responsive to light at at least one wavelength less than 280 nanometers.

BRIEF DESCRIPTION OF THE DRAWING

The FIGURE shows the relative transmission of fibers having a fused silica core and claddings of siloxane, FEP, and fluorine-doped fused silica.

DETAILED DESCRIPTION OF THE INVENTION

In order to obtain a suitable material for a fiber which transmits light in the UV, especially in the short-wavelength UV, I have considered the compatibility between fused silica as a core material and potential cladding materials, the refractive indices of such materials in the UV, and the UV cutoff of the materials.

By "light having a substantial UV component" I mean light of which the ratio of the intensity in the wavelength range from 150 to 300 nanometers, preferably 150 to 280 nanometers, to the intensity in the wavelength range from 150 to 400 nanometers, or of which the ratio of the intensity in the wavelength range from 150 to 200 nanometers to the intensity in the wavelength range from 150 to 250 nanometers, is at least 10%, preferably at least 50%, more preferably at least 90%.

For maximum compatibility between core and cladding, it is desirable that the materials should have physical properties (especially, coefficients of expansion) which are closely similar. The materials should also form an intimate bond to minimize light scattering at the core-cladding interface. If the core is to be silica, then a doped silica cladding generally meets these requirements, though a high concentration of dopant may alter the coefficient of expansion sufficiently from that of silica that compatibility is decreased.

As noted above, it has been found that both fluorine- and boron-doped fused silica exhibit refractive indices, at least in the visible region, which are sufficiently lower than that of pure fused silica that they are acceptable cladding materials in the visible. In the case of fluorine-doped silica, I have observed that this refractive index differential extends into the UV, even to the vacuum UV.

Preferably, the cladding material should be light-transmissive, i.e. its UV cutoff (the point at which it is essentially non-transmissive) should be at a sufficiently short wavelength. In general, dopants that interact chemically with the host lattice tend to broaden the UV absorption tail of the host. This effect has been found to hold for alkali and alkaline earth metals and metal oxides, and serves to increase the refractive index at short wavelengths, thereby making such materials unsuitable for UV transmission.

I have discovered that the dopants present in fluorine-doped fused silica do not cause increased UV absorption and that in consequence an optical fiber comprising a core consisting essentially of synthetic fused silica containing between 500 and 1500 ppm water and a cladding consisting essentially of fluorine-doped synthetic fused silica hving no water therein possesses UV transmission to below 200 nanometers. In the case of the cladding, water therein is not desirable since it tends to react with the fluorine, wherein in the core it is necessary so as to achieve desired optical transmission. The water is incorporated into the core in the form of OH-groups, and the amount should be between 500 and 1500 ppm.

I believe, however, that certain dopants such as are used in such fibers to alter their refractive indices, improve their radiation resistance, etc. will adversely affect the UV transmission properties in the manner referred to above, and I prefer that the synthetic fused silica should contain essentially no elements other than silicon, oxygen and hydrogen and the fluorine-doped synthetic fused silica should contain essentially no elements other than silicon, oxygen, and fluorine.

As the extent of fluorine doping determines the decrease in refractive index, I prefer that the greatest extent of doping consistent with compatibility between the silica core and the fluorine-doped silica cladding and the difficulty of incorporation of a high fluorine content be employed. This generally results in a fluorine content of approximately 4 to 5 mole percent in the fluorine-doped silica.

Step-index preforms having a fused silica core and a fluorine-doped fused silica cladding are commercially available, e.g. from Heraeus-Amersil Inc. under the trade designation Fluosil. These have an O.D. to core ratio of 1.2 or 1.4. I have found that fibers having a core diameter of from 50 to 400 micrometers, and coated with conventional buffer or jacket layers such as RTV silicone or polyimide, may be drawn using conventional fiber-drawing techniques; and these fibers will have a satisfactory UV transmission.

The FIGURE shows the relative transmission of 1 meter lengths of fibers each having a fused silica core and having claddings of siloxane, FEP, and fluorine-doped fused silica. Line a is for siloxane cladding, b for FEP, and c for fluorine-doped fused silica. It is apparent from the FIGURE that the siloxane clad fiber is unusable below about 210 nanometers, and the FEP-clad fiber below about 200 nm, while the fiber clad with fluorine-doped fused silica still has a transmission exceeding 50% at 200 nm.

Even in wavelengths where siloxane- or FEP-clad fibers exhibit some transmission (such as 200–250 nm), it is evident that the fluorine-doped silica fiber has a much higher transmission, and this enables the use of a much longer fiber for a given amount of light to pass through the fiber, enabling the use of such a fiber in situations where siloxane- or FEP-clad fiber would not be satisfactory.

Fibers prepared in this manner may find specific applications in, for example, the detection and quantitation of relative concentration by spectroscopy of materials having spectral lines in the short wavelength UV, as a light transmission means in the vacuum UV, in "solar-blind" detectors, i.e. detectors for optical sources e.g. sparks or flames, which are insensitive to solar radiation (which has a short wavelength cutoff at about 280 nanometers), and in luminescence thermometers (such as the type described in U.S. Pat. Nos. 4,075,493 and 4,215,275, the disclosures of which are incorporated herein by reference).

The fibers prepared in this manner are useable in conjunction with, for example, a light source which comprises an arc, produced by a spark or a plasma, or a light source generated by a laser. If desired, an optical filter which transmits substantially only light having a wavelength less than 280 nanometers can also be used.

I claim:

1. A method of transmitting light of which the ratio of the intensity in the wavelength range from 150 to 300 nanometers to the intensity in the wavelength range from 150 to 400 nanometers is at least 10%, which comprises directing said light onto one end of an optical fiber and withdrawing the light transmitted through said fiber from the other end of said fiber, wherein said fiber comprises a core consisting essentially of synthetic fused silica containing between 500 and 1500 ppm water and a cladding consisting essentially of fluorine-doped synthetic fused silica.

2. The method of claim 1 wherein said ratio is at least 50%.

3. The method of claim 1 wherein said ratio is at least 90%.

4. The method of claim 1 wherein the ratio of the intensity in the wavelength range from about 150 to 280 nanometers to the intensity in the wavelength range from 150 to 400 nanometers is at least about 10%.

5. The method of claim 4 wherein said ratio is at least 50%.

6. The method of claim 5 wherein said ratio is at least 90%.

7. A method of transmitting light of which the ratio of the intensity in the wavelength range from 150 to 200 nanometers to the intensity in the wavelength range from 150 to 250 nanometers is at least 10%, which comprises directing said light onto one end of an optical fiber and withdrawing the light transmitted through said fiber from the other end of said fiber, wherein said fiber comprises a core consisting essentially of synthetic fused silica containing between 500 and 1500 ppm water and a cladding consisting essentially of fluorine-doped synthetic fused silica.

8. The method of claim 7 wherein said ratio is at least 50%.

9. The method of claim 7 wherein said ratio is at least 90%.

10. The method of claim 1 or 7 wherein said fiber has a transmission of at least 5% for a 1 meter length at each wavelength in the wavelength range from 190 to 300 nanometers.

11. The method of claim 1 or 7 wherein the source of said light comprises an arc.

12. The method of claim 1 or 7 wherein the source of said light comprises a spark.

13. The method of claim 1 or 7 wherein the source of said light comprises a plasma.

14. The method of claim 1 or 7 wherein the source of said light comprises a laser.

15. The method of claim 1 or 7 wherein said transmitted light impinges on means responsive to light at at least one wavelength less than 300 nanometers.

16. The method of claim 15 wherein said transmitted light impinges on means responsive to light at at least one wavelength less than 280 nanometers.

17. The method of claim 16 wherein said transmitted light impinges on means responsive to light at at least one wavelength less than 200 nanometers.

18. The method of claim 15 wherein said light-responsive means comprises a luminescent material.

19. The method of claim 15 wherein said light-responsive means determines whether the intensity of the transmitted light at at least one wavelength less than 300 nanometers exceeds a predetermined level.

20. The method of claim 15 wherein said light responsive means determines the quantitative intensity of the transmitted light at at least one wavelength less than 300 nanometers.

21. The method of claim 15 wherein said light-responsive means is responsive substantially only to light having a wavelength less than 280 nanometers.

22. The method of claim 21 wherein said light-responsive means comprises an optical filter which transmits substantially only light having a wavelength less than 280 nanometers.

23. Apparatus comprising:
(a) an optical fiber, which fiber comprises a core consisting essentially of synthetic fused silica containing between 500 and 1500 ppm water and a cladding consisting essentially of flourine-doped synthetic fused silica; and
(b) means adjacent one end of said fiber and responsive to light at at least one wavelength less than 280 nanometers.

24. The apparatus of claim 23 wherein said light-responsive means is responsive to light at at least one wavelength less than 250 nanometers.

25. The apparatus of claim 24 wherein said light-responsive means is responsive to light at at least one wavelength less than 200 nanometers.

26. The apparatus of claim 23 wherein said light-responsive means is responsive substantially only to light having a wavelength less than 280 nanometers.

27. The apparatus of claim 26 wherein said light-responsive means comprises an optical filter which transmits substantially only light having a wavelength less than 280 nanometers.

28. The apparatus of claim 23 wherein said fiber has a transmission of at least 5% for a 1 meter length at each wavelength in the wavelength range from 190 to 280 nanometers.

29. The apparatus of claim 23 wherein said light-responsive means comprises a luminescent material.

30. The apparatus of claim 23 wherein said light-responsive means can determine whether the intensity of light passing through said fiber to impinge upon it at at least one wavelength less than 280 nanometers exceeds a predetermined level.

31. The apparatus of claim 23 wherein said light-responsive means can determine the quantitative intensity of light passing through said fiber to impinge upon it at at least one wavelength less than 280 nanometers.

32. The apparatus of claim 23 which further comprises:
(c) a source of light which emits at at least one wavelength less than 280 nanometers.

33. The apparatus of claim 32 wherein said light source comprises an arc.

34. The apparatus of claim 33 wherein said light source comprises a spark.

35. The apparatus of claim 33 wherein said light source comprises a plasma.

36. The apparatus of claim 33 wherein said light source comprises a laser.

37. Apparatus for indicating the occurrence of an event producing light at at least one wavelength less than 280 nanometers, which apparatus is insensitive to the presence of solar radiation, comprising:
(a) an optical fiber, one end of which is positioned such that at least a portion of the light produced by said event will impinge on it, which fiber comprises a core consisting essentially of synthetic fused silica containing between 500 and 1500 ppm water and a cladding consisting essentially of fluorine-doped synthetic fused silica;
(b) means, positioned adjacent the other end of said fiber such that light passing through said fiber will impinge on it, which is responsive substantially only to light having a wavelength less than 280 nanometers and determines whether the intensity of said light at at least one wavelength less than 280 nanometers exceeds a predetermined level; and
(c) alarm means, connected to said light-responsive means (b) and actuated thereby, which emits an alarm signal when said light-responsive means determines that said light intensity exceeds said predetermined level.

38. Apparatus for remotely measuring temperature, comprising:
(a) a length of optical fiber, which fiber comprises a core consisting essentially of synthetic fused silica containing between 500 and 1500 ppm water and a cladding consisting essentially of fluorine-doped synthetic fused silica;
(b) a layer of luminescent material held at one end of said optical fiber in optical communication therewith, said luminescent material being characterized by having a substantial response to excitation by light having a wavelength less than 300 nanometers, and by emitting, when excited, light that varies as a function of the temperature of the luminescent material;
(c) means at the other end of said optical fiber for transmitting light, of which the ratio of the intensity in the wavelength range of 150 to 300 nanometers to the intensity in the wavelength range of 150 to 400 nanometers is at least 10%, through said fiber and onto said luminescent material to cause it to emit light; and
(d) means near said other end of said optical fiber for detecting light emitted by said luminescent material.

39. An apparatus for the spectroscopic determination of a chemical species having a major emission spectral line at a wavelength less than 200 nanometers, which comprises:
(a) means for exciting a sample to be tested for the presence of said chemical species such that it would emit said spectral line;
(b) an optical fiber, one end of which is positioned such that at least a portion of the light emitted by said species will impinge on it, which fiber comprises a core consisting essentially of synthetic fused silica containing between 500 and 1500 ppm water and a cladding consisting essentially of fluorine-doped synthetic fused silica; and
(c) detector means, positioned adjacent the other end of said fiber such that said light passing through said fiber will impinge on it, which is responsive to said spectral line.

* * * * *